Dec. 26, 1967

E. B. BATES 3,360,354

MANDREL SUPPORTING APPARATUS

Filed Dec. 24, 1964

INVENTOR.
EDWARD B. BATES
BY Philip M. Rice
& W. A. Schaich
ATTORNEYS

Dec. 26, 1967 E. B. BATES 3,360,354
MANDREL SUPPORTING APPARATUS
Filed Dec. 24, 1964 4 Sheets-Sheet 3

INVENTOR.
EDWARD B. BATES
BY Philip M. Rice
& W. A. Schaich
ATTORNEYS

United States Patent Office 3,360,354
Patented Dec. 26, 1967

3,360,354
MANDREL SUPPORTING APPARATUS
Edward B. Bates, Elmer, N.J., assignor to Owens-Illinois, Inc., a corporation of Ohio
Filed Dec. 24, 1964, Ser. No. 420,963
10 Claims. (Cl. 65—184)

This invention relates generally to improvements in apparatus for continuously drawing rod, tubing or the like of glass or other thermoplastic material and, more particularly, relates to improved means for supporting the forming mandrel utilized in the drawing of such articles.

The present invention is especially adapted for use in conjunction with apparatus such as that described in U.S. Patent No. 1,219,709 to Danner, issued March 20, 1917, entitled "Apparatus for Forming Molten Material in Cylindrical Form." In such apparatus, a supply stream of molten glass flows downwardly onto a continuously rotating, downwardly inclined mandrel and either solid rod or hollow tubing is continuously drawn from the lower or discharge end of the mandrel. The working portion of the mandrel as well as the flowing supply stream and deposited glass surrounding the working portion of the mandrel are all enclosed in a heated chamber or muffle to control glass temperatures to obtain a uniform product.

Conventionally, in the manufacture of glass rod or tubing as practiced by the Danner process, a tubular refractory sleeve is mounted on a metallic blowpipe which serves to permit the molten glass to flow thereon due to the rotation of the mandrel as well as the action of gravity in combination with lengthwise drawing of the material therefrom in a substantially horizontal direction. In the making of tubing, the mandrel discharge end has a perforated tip which is employed as a blowpipe, and in the making of rod, an imperforate tip is utilized having a conical shape at its lower extremities.

Because of the great heat which is present in the heated chamber or muffle, it is necessary to support the mandrel exteriorly of such muffle. Typically, the mandrel will be supported by means of a member which grasps the metallic blowpipe and which rotates to impart a continuous rotation to the downwardly inclined blowpipe. The tubular refractory sleeve is mounted on the free end of the metallic blowpipe, as, for example, by being clamped between a radially extending flange member at the end of the blowpipe and a collar urged toward said flange. The refractory sleeve serves the function of receiving the molten glass and of preventing the intense heat from reaching the metallic blowpipe.

It is essential that the mandrel be supported so that all points thereon follow a precisely concentric path during rotation as any eccentricity will result in a wobbling effect which becomes greatly magnified at the free end thereby causing an unequal distribution of glass in the walls of the being-formed tubing. Such precise concentricity results from coaxial alignment of the mandrel and the axis of rotation and is extremely difficult to achieve and maintain, particularly where the article is being supported as a cantilever. Such difficulties are aggravated when, as frequently happens, adjustments are required which necessitate loosening and subsequent retightening of the supporting structure.

Accordingly, it is an object of the present invention to provide apparatus for supporting elongated articles.

It is another object of the present invention to provide apparatus for supporting articles in cantilever fashion.

It is a further object of the present invention to provide a self-centering rotatable chuck for supporting articles and which is characterized by a feature for insuring coaxial positioning of the article with respect to the axis of rotation.

It is a further object of the present invention to provide apparatus for holding elongated rotatable articles in which the article is engaged at two longitudinally spaced apart areas.

In the production of rod and tubing under the Danner process the refractory sleeve, as previously noted, is clamped between a radially extending flange mounted on the end of the blowpipe and a collar urged toward said flange. Thus, the sleeve is continuously subjected to an axially directed compressive force. Because of the intense conditions to which the refractory sleeve is subjected, it has a tendency to shrink. As a result of such shrinkage, it is customary to spring urge the collar toward the radially extending flange in order that the compressive force imparted to the sleeve will be substantially uniform despite such shrinkage. However, the spring and the handwheel for adjusting the pressure which such spring exerts against the sleeve are located upstream from the mandrel supporting chuck. In other words, the mandrel supporting chuck is located between the refractory sleeve and the spring which is imparting the compressive forces against the sleeve. Inasmuch as the chuck supports the blowpipe in a fixed position and the compressive forces from the spring must be transmitted through the chuck in order to reach the sleeve, the effectiveness of the spring in maintaining uniform compressive forces upon the shrinking sleeve is poor.

Under the present invention, the chuck is capable of holding a blowpipe in a fixed rotative position and yet is free to transmit a substantially uniform compressive force to the sleeve despite its shrinkage.

Accordingly, it is an additional object of the present invention to provide a chuck for supporting a mandrel blowpipe in which the axial pressure on the mandrel sleeve can be controlled and adjusted without affecting the grab of the chuck fingers on the blowpipe.

Other objects and advantages of the present invention will become readily apparent from the following detailed description taken in conjunction with the annexed sheets of drawings on which:

Figure 1:
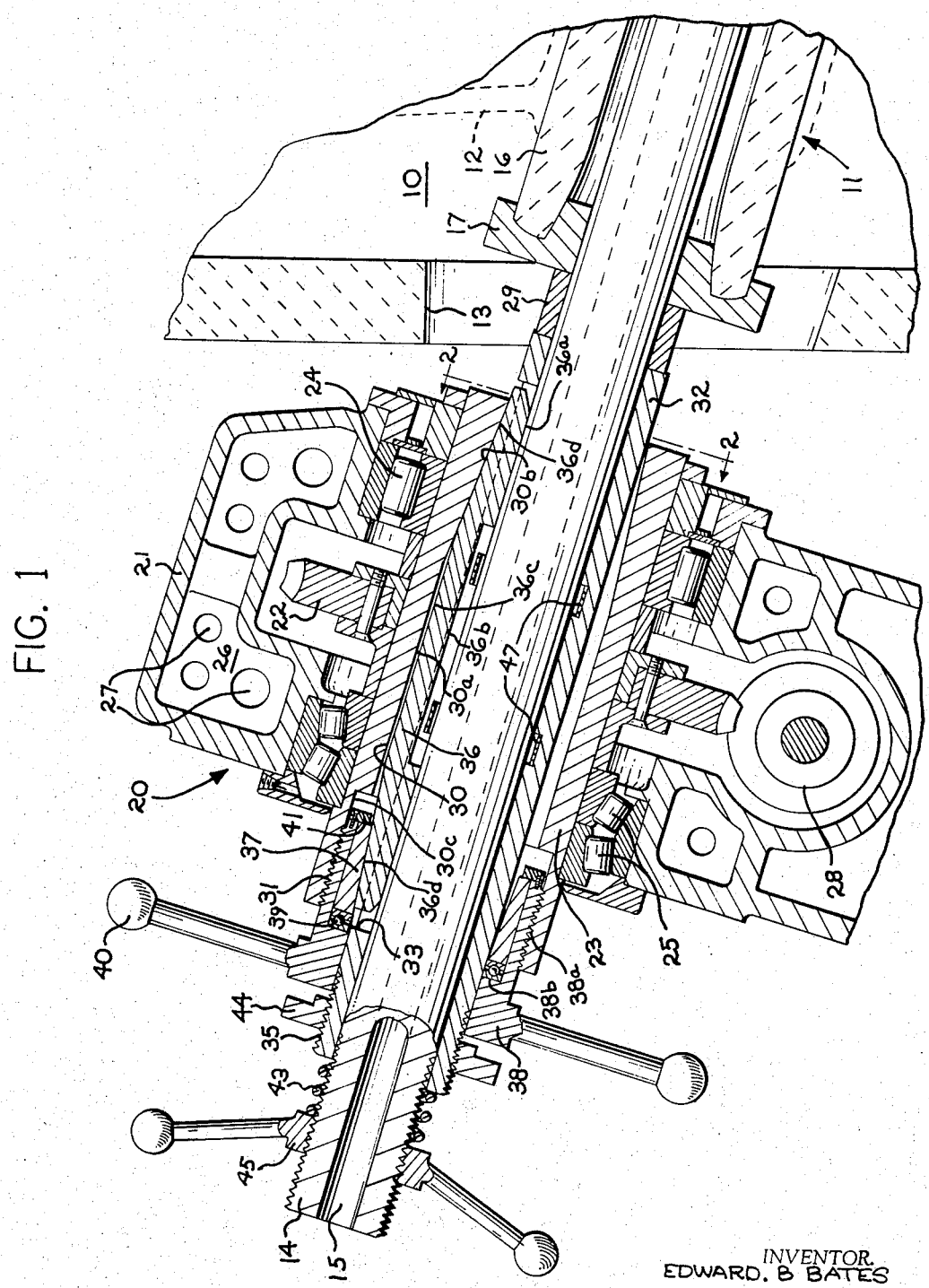
FIGURE 1 is a sectional elevational view of the apparatus of the present invention showing a mandrel secured therein.

Referring now to FIGURE 1, there is illustrated a muffle or chamber generally designated by the numeral 10 which encloses the leading portion of a downwardly-inclined mandrel generally designated by the numeral 11 upon the external surface of which molten glass flows.

The molten glass is delivered onto the mandrel in the form of a supply stream 12 flowing from a source not shown. The molten glass stream 12 is continuously deposited on the rotating mandrel 11 and smoothly flows over its essentially cylindrical surface initially in a helical, then in a cylindrical pattern and subsequently in a frustoconical pattern. The glass is drawn in a constricting manner in catenary form from the discharge end of the mandrel at prescribed rates into a lengthy cylindrical product as is well known in the art. The mandrel 11 is supported externally of the muffle and extends through an opening 13 in the muffle where it receives the supply stream 12.

The mandrel 11 comprises a blowpipe 14 having a central passageway 15 through which inflating air may be directed to the interior of the being-formed cylindrical product as is well known in the art. The blowpipe 14 is generally formed of Nichrome metal; however, high temperature steel alloys or other metals may be used. A ceramic sleeve or refractory member 16 is positioned over the blowpipe 14 in a position to intercept the supply stream 12. The refractory member 16 is normally maintained in a spaced relationship with respect to the blowpipe 14 to prevent excessive heat from reaching the blowpipe. The upper end of the refractory member is held in place by a back collar 17 which is contoured to receive the end of the refractory member 16 and hold it in coaxial relationship to the blowpipe 14. As is well known in the art, the back collar 17 is urged downwardly toward the free end of the mandrel 11 to thereby impart a compressive force to the refractory member 16, the free end of the refractory member 16 being held in place by a radially extending flange member secured to the free end of the blowpipe 14.

The blowpipe is rotatably supported by a sleeve-drive and blowpipe chuck generally designated by the numeral 20. The sleeve-drive and blowpipe chuck 20 comprises a housing 21 in which is positioned a gear 22 driven by a worm 28 connected to any desired power means. A drive sleeve 23 is secured to the gear 22 for rotation therewith. As is well known in the art, the sleeve-drive and blowpipe chuck 20 is provided with a series of substantially cylindrical forward bearings 24 and a series of rear bearings 25. The rear bearings 25 are operable in pairs, the longitudinal axes of which are angled relative to one another to form a V. Such positioning of the rear bearings permits them to absorb longitudinal thrust resulting from the downward inclination of the mandrel as well as the radial thrust. The housing 21 is provided with chambers 26 and passageways 27 through which a liquid coolant may be directed.

The drive sleeve 23 has an annular configuration, the inner surface of which is defined by a wall 30. The wall 30 includes a central portion 30a which is substantially cylindrical and a lower portion 30b which tapers inwardly toward the longitudinal axis. Additionally, the inner wall 30 has a recessed upper portion 30c having inwardly facing threads 31.

Positioned within the drive sleeve 23 is a chuck sleeve 32 within which the blowpipe 14 is loosely received. The chuck sleeve 32 is urged against the back collar 17 through a spacer 29 positioned therebetween. The chuck sleeve 32 is provided with three longitudinal slots 33 which, preferably, are spaced equally about the chuck sleeve 32. Additionally, under one embodiment, the chuck sleeve has a pair of inwardly facing grooves 34 which follow a generally annular path about the inner surface thereof, the path being interrupted by the slots 33. Outwardly facing threads 35 are formed at the upper end of the chuck sleeve 32.

Each of the slots 33 has a chuck finger 36 loosely positioned therein. The chuck fingers 36 are somewhat shorter than the slots 33 and are, thus, free to move longitudinally with respect to such slots. Each of the chuck fingers 36 is provided with a pair of longitudinally spaced apart blowpipe-grasping faces 36a which are separated by a recessed portion 36b. The outer surface of the chuck fingers 36 has a central portion 36c which is maintained in a spaced relationship with the cylindrical central wall portion 30a of the drive sleeve and which is substantially parallel thereto. At opposite ends of the central portion 36c are end portions 36d which taper inwardly toward the longitudinal axis. The chuck finger end portion 36d at the lower end engages the inwardly tapering lower portion 30b of the wall 30.

The chuck finger end portion 36d at the upper end is engaged by an annular wedge-shaped clamping ring 37. Longitudinal movement of the clamping ring 37 toward the inwardly tapering inner wall portion 30b acts to urge the chuck finger 36 radially inwardly into firm engagement with the blowpipe 14. The fact that the chuck fingers 36 are shorter than the slots in which they are positioned permits them to move longitudinally to thereby seek and maintain a position at which the radially-inwardly directed force resulting from the cooperating inwardly tapering surfaces becomes equalized with the result that each of the chuck finger end portions 36d engages the blowpipe 14 with substantially the same force. Such equalization of pressure insures that the blowpipe 14 is held with its longitudinal axis precisely coaxial with the axis of rotation. Additionally, such excess slot length also allows the slotted chuck sleeve 32 to be urged downwardly to press against the back collar 17 even though the chuck fingers are tightly grasping the blowpipe 14.

Movement of the clamping ring 37 and its resultant tightening or loosening of the blowpipe chuck is effected by means of a rotatable collar 38 having outwardly facing threads 38a engaging the drive sleeve threads 31 and having an abutment face 38b. If desired, a row of bearings 39 may be positioned between the collar abutment face 38b and the upper end of the clamping ring 37 to prevent binding when the collar is rotated. The collar 38 is rotated by means of a handwheel 40. A radially inwardly directed flange 41 is secured to the lower end of the collar 38, as by machine screws 42. Such flange, upon the unscrewing of the collar during release of the blowpipe 14, will engage the lower end of the clamping ring 37 thereby drawing it out of engagement with the chuck fingers 36.

Engaged to the chuck sleeve threads 25 is a locking nut 44 which locks against the collar 38 during assembly and disassembly of the apparatus but which is out of contact with the collar during operation of the apparatus. Additionally, a handwheel 45 is engaged to the threads at the upper end of the blowpipe 14. A compression spring 43 is positioned between the handwheel 45 and the chuck sleeve 32. As is well known in the art, the handwheel 45 and compression spring 43 serve to urge the chuck sleeve 32 and the spacer 29 against the back collar 17 and the refractory member 16, the other end of the refractory member 17 being engaged by the radial flange at the free end of the blowpipe 14. Thus, the refractory sleeve 16 is maintained continuously under compression.

In order to permit the blowpipe 14 to be removed from the sleeve-drive and blowpipe chuck 20 without the chuck fingers falling to the resulting cavity, there are provided a pair of annular rings 47 which are secured to the chuck sleeve grooves 34 and which are received in the recessed portion 36b of the chuck fingers.

Figure 2:
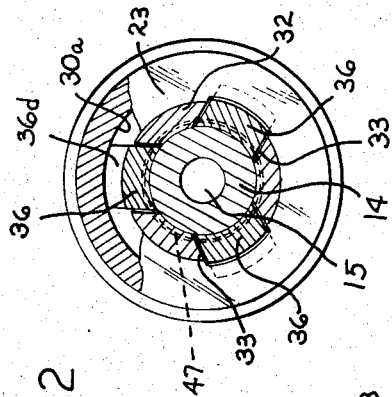
FIGURE 2 is a sectional view taken along line 2—2 of FIGURE 1.
Figure 3:
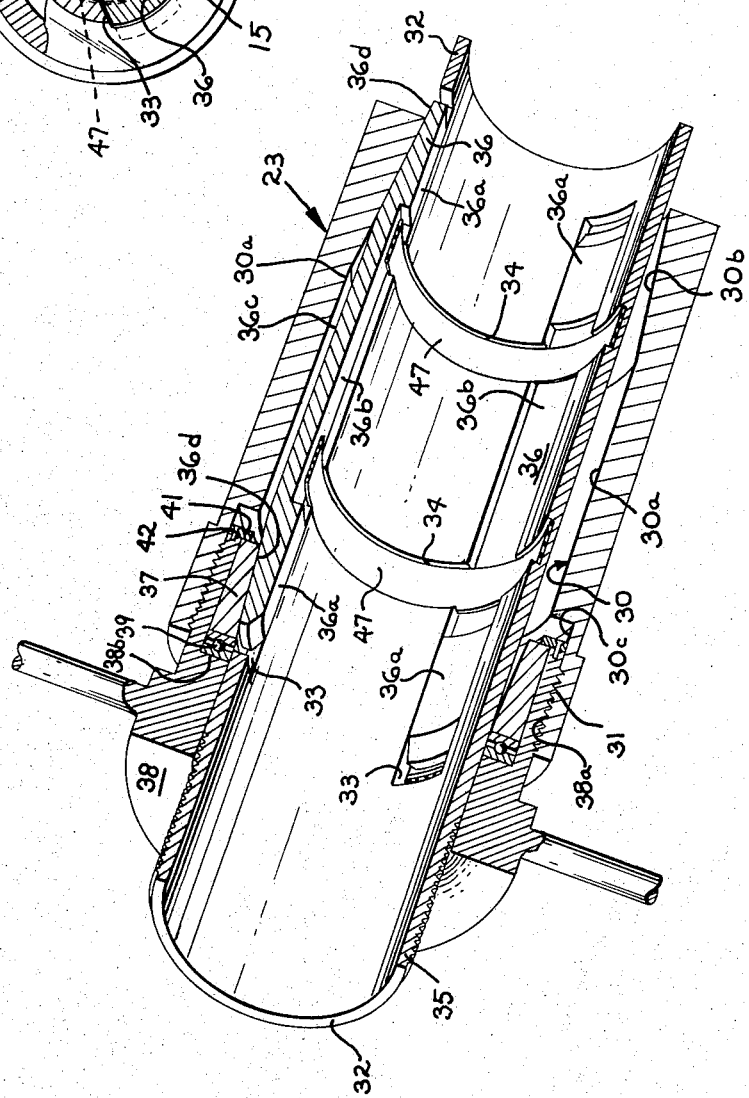
FIGURE 3 is a perspective view of the supporting apparatus showing particularly the slotted chuck sleeve with the chuck fingers and the retaining rings positioned therein.
Figure 10:
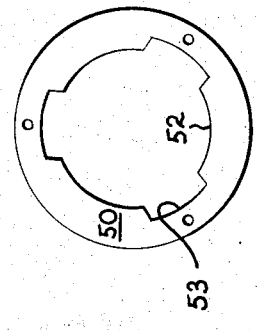
FIGURE 10 is a plan view of the plate for limiting longitudinal movement of the chuck fingers.
Figure 4:
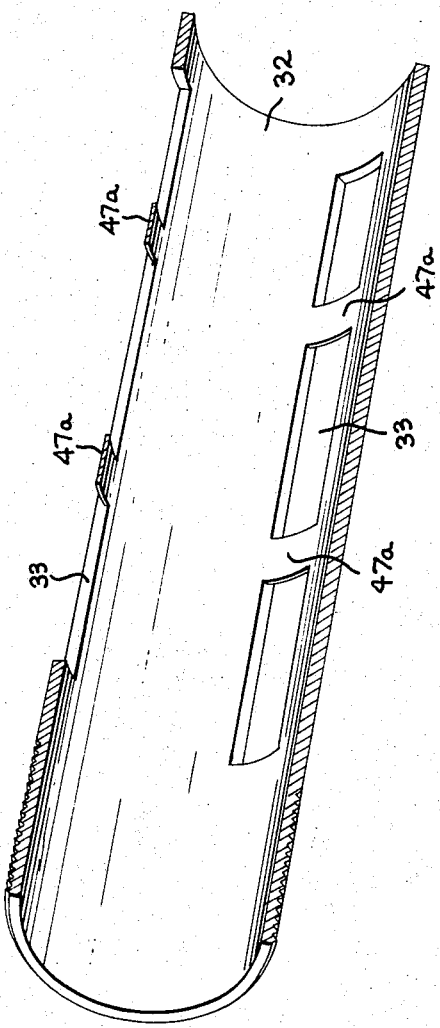
FIGURE 4 is a perspective view of a modified chuck sleeve.
Figure 9:
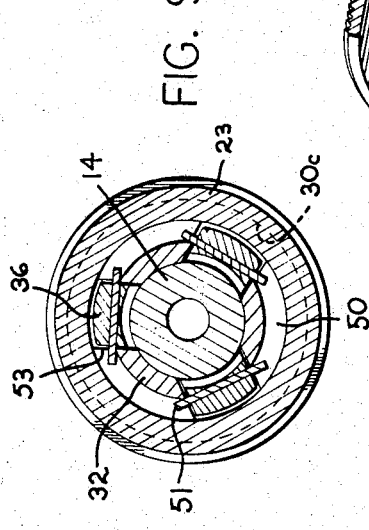
FIGURE 9 is a sectional view taken through line 9—9 of FIGURE 5.

Referring now to FIGURE 4 there is illustrated a modified chuck sleeve 32 in which the annular rings 47 of the previous embodiment are eliminated and are replaced by ring segments 47a spanning the longitudinal slots 33. The ring segments may be integrally formed with the sleeve 32 or maybe welded thereto. The utilization of the ring segments 47a eliminates the necessity for providing the annular grooves 34 in the chuck sleeve of the embodiment of FIGURES 1 through 3. While the ring segments 47a are illustrated in FIGURE 4 as being substantially flush with the inner surface of the chuck sleeve bore, they may be slightly recessed from said inner surface.

Referring now to FIGURES 5 through 10 there is illustrated a further embodiment wherein means are provided for limiting the amount of longitudinal movement of the chuck fingers 36 upon insertion of the blowpipe 14 in the chuck sleeve 32 to thereby prevent such chuck fingers from being carried by the blowpipe 14 into engagement with the clamping ring 37. Engagement of the fingers 36 with the clamping ring 37 is undesirable as it causes the fingers to be urged inwardly to grab and thus impede the axial movement of the blowpipe 14 during insertion. The drive sleeve 23 is provided with a chuck finger stop plate 50 which is mounted on the radial flange between the cylindrical central portion 30a and the recessed upper portion 30c of the inner wall 30. As may be seen from FIGURE 10 the chuck finger stop plate 50 is provided with a bore 52 sized to receive the chuck sleeve 32 and three radially directed notches 53, each of which is located and sized to receive the outer portion of one of the chuck fingers 36.

Each of the chuck fingers 36 is provided with a laterally-extending pin 51 which extends beyond each side of its respective chuck finger 36 and is located radially outwardly from the chuck sleeve 32. The length of the pin 51 is such that it spans the chuck sleeve slot 33 and the notch 53 of the plate 50. Thus, upon upwardly inclined movement (leftward in FIGURES 5 through 8) of the chuck fingers 36, the pins 51 will engage the plate 50 at opposite sides of the respective notches 53. The engagement of the respective pins against the stop plate 50 prevents any additional upward movement of the respective chuck fingers 36 upon insertion of the blowpipe 14 into the chuck sleeve 32 and thereby prevents inward urging of the chuck fingers against the clamping ring 37 with its ensuing grabbing of the blowpipe 14. This may be clearly seen by viewing the sequence of adjustments illustrated in FIGURES 5 through 8.

Figure 5:
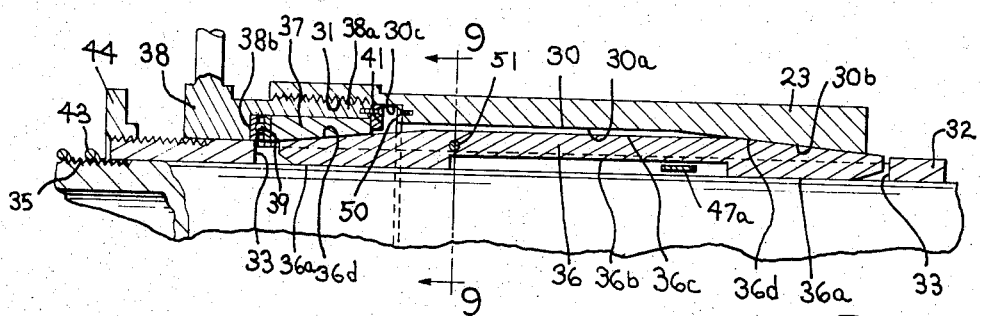
FIGURE 5 is a fragmentary sectional elevational view showing a modified embodiment of the present invention with the chuck fingers tightly gripping the blowpipe.

In FIGURE 5, the apparatus is illustrated with the parts in a position to clamp the blowpipe 14 and permit its rotative movement in order that the mandrel can receive a supply stream of molten glass. Thus, the relative positioning of the parts of the embodiment of FIGURE 5 is substantially the same as that for the embodiment illustrated in FIGURE 1. It should be additionally noted that the utilization of the pin 51 obviates the necessity for providing a ring segment 47a at the upper end of the chuck sleeve 32 as the pin 51 engaging the outer surface of the chuck sleeve 32 effectively prevents that end of the chuck finger 36 from collapsing into the cavity resulting from removal of the blowpipe 14. Thus, the chuck sleeve 32 in the embodiment of FIGURE 5 is provided with only a single ring segment 47a. If desired, a second laterally extending pin may be positioned in the chuck finger 32 near the other end thereby eliminating the necessity for the ring 47 or ring segment 47a at the lower end of the chuck sleeve. Additionally, if the chuck sleeve 32 is utilized without any rings 47 or ring segments 47a, the chuck fingers 36 may be formed without the recessed portion 36b. The inner blowpipe grasping face 36a would then extend without interruption substantially throughout the length of the chuck fingers.

Figure 6:
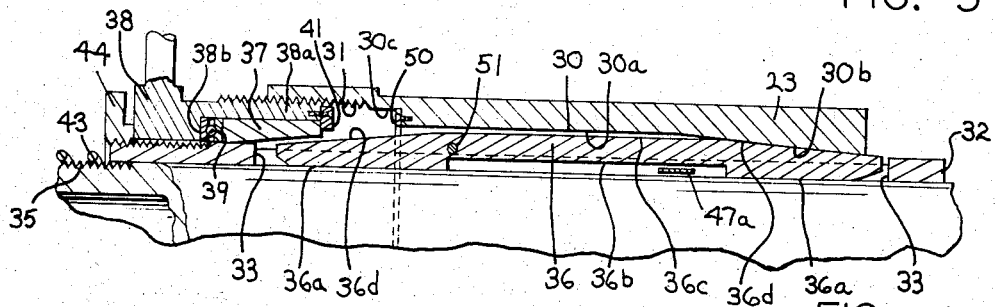
FIGURE 6 is a view similar to FIGURE 5 showing the collar backed off to disengage the clamping ring from the chuck fingers thereby releasing the blowpipe from the grip of the chuck fingers.

FIGURE 6 illustrates the first step in releasing the blowpipe 14 from the sleeve-drive and blowpipe chuck 20. The handwheel 40 has been rotated to back the collar 38 away from the chuck fingers 36. Such backing off of the collar 38 causes the flange 41 to engage the clamping ring 37 and carry such clamping ring with it to thereby disengage the clamping ring 37 from the upper end portion 36d of the respective chuck fingers. The collar 38 then engages the locking nut 44 which is secured to the chuck sleeve 32.

Figure 7:
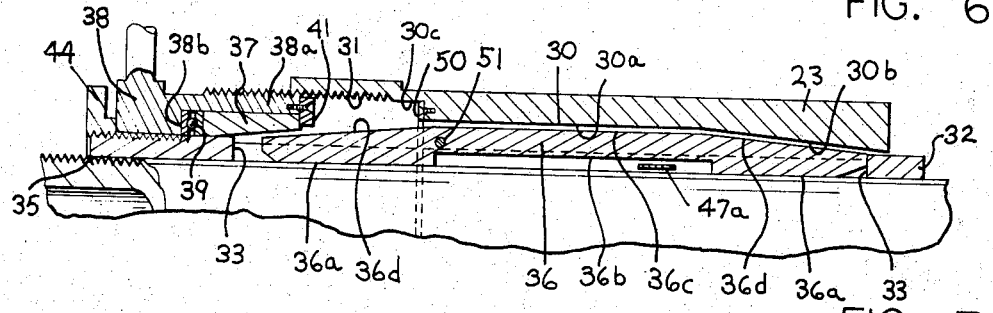
FIGURE 7 is a view similar to FIGURE 6 showing the collar backed off further while engaging the locking collar to pull it, the chuck sleeve, and, thereafter, the chuck fingers up the incline thereby disengaging the chuck fingers from the drive sleeve inwardly tapering lower portion.

Referring now to FIGURE 7, the collar 38 is backed off still further while preventing any rotation of the locking nut 44. Such continued axial movement of the collar 38 against the locking nut 44 serves to carry the locking nut 44 and, thus, the chuck sleeve 32 therewith. Accordingly, the chuck sleeve 32 is drawn up the incline (to the left) by the collar 38. Such upward movement of the chuck sleeve 32 causes the lower (right in FIGURE 7) end of the slots 33 to engage the lower end of the respective chuck fingers 36 and, similarly, draw said chuck fingers upwardly. Such movement disengages the chuck finger lower end portions 36d from the inwardly tapering lower portion 30b of the drive sleeve inner wall 30, thus releasing the blowpipe 14 from the grab of the lower end of the chuck fingers 36.

Figure 8:
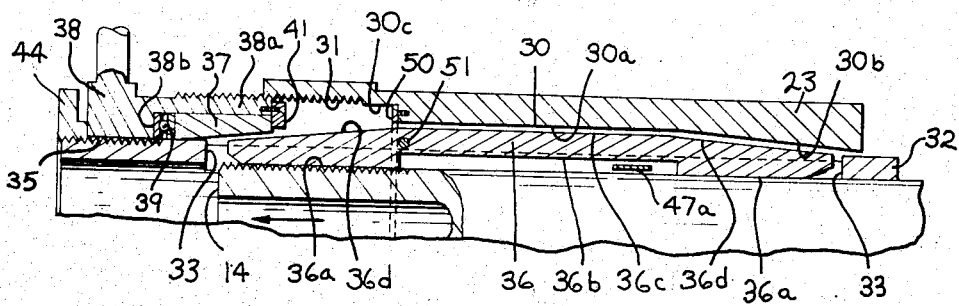
FIGURE 8 is a view similar to FIGURE 7 showing the position of the various parts during insertion of the blowpipe in the chuck sleeve.

Similarly such movement carries the pin 51 towards the chuck finger stop plate 50 so that the distance between such pin and the stop plate is less than the distance between the chuck fingers 36 and corresponding points of the clamping ring 37. This is illustrated in FIGURE 8 in which collar 38 and the locking nut 44 are in the same relative position with respect to the drive sleeve 23 and chuck sleeve 32 as that illustrated in FIGURE 7. FIGURE 8 illustrates the positioning of the chuck fingers 36 upon insertion of the blowpipe in the chuck sleeve, such insertion being from the lower end toward the upper end (left to right in FIGURE 8). The axial movement of the blowpipe 14 tends to carry the loose chuck fingers 36 therewith. Such axial movement of the chuck fingers 36 is stopped when the pin 51 reaches the plate 50. Accordingly, the chuck fingers 36 are prevented from being carried, upon insertion of the blowpipe, into engagement with the clamping ring 37, and thus are prevented from interfering with insertion of the blowpipe.

It should be understood that the description given in connection with the loosening of the blowpipe illustrated in FIGURES 5 through 8 was intended for the purpose of illustration and not limitation. For example, it is possible to back the collar 38 off until it reaches the locking nut 44. Then the chuck sleeve 32 can be drawn up the incline by tightening the locking nut 44 against the collar 38 rather than by holding the locking nut fixed and continuing to back off the collar 38.

It can be seen from the foregoing description that the present invention provides a chuck well suited for holding articles in a precise position, particularly with respect to a desired axis of rotation. Additionally, it can be loosened and resecured with assurance that it will return to the same axial position. Furthermore, its feature of permitting the chuck sleeve to move axially while the blowpipe is rigidly held in place, permits uniform compressive forces to be directed to the refractory sleeve despite any tendency of the refractory sleeve to shrink. While the present invention is particularly well suited for supporting a rotatable mandrel as used in the Danner process for drawing tubing, it can obviously be used for supporting a wide variety of articles.

Numerous modifications may be resorted to within the spirit and scope of the appended claims.

I claim:

1. In apparatus for forming tubing or rod wherein molten material is wrapped about a rotating mandrel having a central supporting member and is drawn from the free end thereof in the form of a cylindrical article,
   (a) a drive sleeve rotatable about a central axis and having an axial bore, said axial bore tapering to a reduced size at one end, the tapering bore at said one end defining an inwardly flaring camming surface,
   (b) a chuck sleeve positioned in said axial bore and encircling said central supporting member, said chuck sleeve having at least three longitudinal slots,
   (c) a finger loosely positioned in each of said slots, said fingers having inwardly facing grasping surfaces, a pair of outwardly facing camming surfaces at opposite ends of said finger, each of said camming surfaces in the direction approaching its respective end of said finger flaring inwardly toward said central axis, one of said camming surfaces engaging the drive sleeve camming surface, (d) a wedge member engaging the other of said finger camming surfaces, and (e) means for axially moving said wedge member toward said drive sleeve camming surface to urge both ends of said fingers radially inwardly into engagement with said supporting member.

2. The apparatus defined in claim 1 including means spanning each of said slots and engaged with said chuck sleeve to prevent the inward collapse of said fingers upon removal of said supporting member from said chuck sleeve.

3. The apparatus as defined in claim 1 further including means for restricting the longitudinal movement of said chuck fingers with respect to said drive sleeve comprising an annular plate secured within said drive sleeve and encircling said chuck sleeve, said plate having inwardly facing notches sized to receive said fingers, and means extending laterally from said fingers, said laterally extending means being positioned between said annular plate and said inwardly flaring camming surface and sized to engage said plate upon the urging of said fingers toward said wedge member.

4. In apparatus for forming tubing or rod wherein molten material is wrapped about a rotating mandrel having a central supporting member and drawn from the free end thereof in the form of a cylindrical article, (a) a drive sleeve rotatable about a central axis and having an axial bore, said axial bore tapering to a reduced size at one end, the tapering bore at said one end defining an inwardly flaring camming surface, (b) a chuck sleeve positioned in said central bore and loosely encircling said central supporting member, said chuck sleeve having at least three longitudinal slots, (c) a finger loosely positioned in each of said slots, said fingers having inwardly facing grasping surfaces separated by a recess, a pair of outwardly facing camming surfaces in opposite ends of said finger, each of said camming surfaces in the direction approaching its end of said finger flaring inwardly toward said central axis, one of said camming surfaces engaging the drive sleeve camming surface, (d) a wedge member engaging the other of said finger camming surfaces, (e) means for axially moving said wedge member toward said drive sleeve camming surface to urge both ends of said fingers radially inwardly into engagement with said supporting member, and (f) ring segments spanning each of said slots and positioned to pass through the recess of each of said fingers to prevent the inward collapse of said fingers upon removal of said supporting member from said chuck sleeve.

5. In apparatus for forming tubing or rod wherein molten material is wrapped about a rotating mandrel having a central supporting member and is drawn from the free end thereof in the form of a cylindrical article, (a) a drive sleeve rotatable about a central axis and having an axial bore, said axial bore tapering to a reduced size at one end, the tapering bore at said one end defining an inwardly flaring camming surface, the other end of said drive sleeve being threaded, (b) a chuck sleeve positioned in said axial bore and loosely encircling said central supporting member, said chuck sleeve having at least three longitudinal slots, (c) a finger loosely positioned in each of said slots, said fingers having inwardly facing grasping surfaces, a pair of outwardly facing camming surfaces at opposite ends of said finger, each of said camming surfaces in the direction approaching its respective end of said finger flaring inwardly toward said central axis, one of said camming surfaces engaging the drive sleeve camming surface, (d) a wedge member engaging the other of said finger camming surfaces, (e) a collar engaging said drive sleeve threaded portion and axially movable upon rotative movement relative to said threaded portion, and (f) means for carrying said wedge member with said collar upon axial movement thereof toward said drive sleeve camming surface to urge said fingers radially inwardly into engagement with said supporting member.

6. The apparatus as defined in claim 5 including means for carrying said wedge member with said collar upon axial movement thereof away from said drive sleeve camming surface to release said fingers from said supporting member.

7. In apparatus for forming tubing or rod wherein molten material is wrapped about a rotating mandrel having a central supporting member and drawn from the free end thereof in the form of a cylindrical article (a) a drive sleeve rotatable about a central axis and having an axial bore, said axial bore having a tapered portion disposed at an angle relative to said central axis, said tapered portion defined by a camming surface, (b) a chuck sleeve positioned in said axial bore and loosely encircling said central supporting member, said chuck sleeve having at least three longitudinal slots, (c) a finger loosely positioned in each of said slots, said fingers having inwardly facing grasping surfaces, first and second outwardly facing camming surfaces at opposite ends of said finger, said first camming surface being substantially parallel to and engageable with said drive sleeve camming surface, said second camming surface converging toward said first camming surface and being disposed at an angle relative to said central axis substantially equal to the angle between said first camming surface and said central axis, (d) camming means engaging said second camming surface, and (e) means for urging said camming means in a direction to cause engagement of the respective engageable members to urge both ends of said fingers radially inwardly into engagement with said supporting member.

8. In apparatus for forming tubing or rod wherein molten material is wrapped about a rotating mandrel having a central supporting member and drawn from the free end thereof in the form of a cylindrical article (a) a drive sleeve rotatable about a central axis and having an axial bore, said axial bore having a tapered portion disposed at an angle relative to said central axis, said tapered portion defined by a camming surface, (b) a chuck sleeve positioned in said axial bore and loosely encircling said central supporting member, said chuck sleeve having at least three longitudinal slots, (c) a finger loosely positioned in each of said slots, said fingers having inwardly facing grasping surfaces, first and second outwardly facing camming surfaces at opposite ends of said fingers, said camming surfaces being disposed at substantially opposite angles relative to said central axis, said first camming surface being substantially parallel to and engageable with said drive sleeve camming surface, (d) camming means engaging said second camming surface, and (e) means for urging said camming means in a direction to cause engagement of the respective engageable members to urge both ends of said fingers radially inwardly into engagement with said supporting member.

9. In apparatus for forming cylindrical articles wherein molten glass is wrapped about and drawn over the lower end of a downwardly inclined rotating mandrel, said mandrel including a central blowpipe and a refractory sleeve telescoped over said lower end in a position to receive said molten glass, improved means for supporting said mandrel with its axis coaxial with the axis of rotation comprising an annular chuck sleeve sized to receive said blowpipe therein, said chuck sleeve having a plurality of at least three longitudinal slots, a plurality of at least three chuck fingers, one loosely positioned in each of said slots, said chuck fingers having inwardly facing blowpipe grasping surfaces, and outwardly facing surfaces having longitudinally opposed ends each flaring at an angle with respect to said axis to form a pair of camming surfaces, a drive sleeve encircling said chuck sleeve and said fingers in generally spaced relationship thereto, said drive sleeve having a tapered portion disposed at an angle with respect to said axis, said tapered portion engaging the camming surface at one end of each of said chuck finger and acting thereagainst to urge that end of said chuck fingers radially inwardly into engagement with said blowpipe, and means for imparting a force having both inwardly directed radial and longitudinal components to the camming surface at the other end of said chuck fingers to urge said other end radially inwardly into engagement with said blowpipe while urging said chuck fingers toward said drive sleeve camming surface.

10. The apparatus as defined in claim 9 including means spanning each of said slots and engageable with said chuck sleeve to prevent the inward collapse of said fingers upon removal of said blowpipe from said chuck sleeve.

References Cited
UNITED STATES PATENTS

| | | | |
|---|---|---|---|
| 1,550,995 | 8/1925 | Wilcox | 65—302 |
| 1,977,956 | 10/1934 | Soubier | 65—89 |
| 2,310,474 | 2/1943 | Teichmann | 65—89 |
| 2,429,220 | 10/1947 | Danner | 65—184 |
| 2,972,837 | 2/1961 | Pinotti | 65—184 X |
| 3,194,645 | 7/1965 | Green et al. | 65—302 X |
| 3,219,426 | 11/1965 | Steer | 65—302 X |
| 3,236,619 | 2/1966 | Frye et al. | 65—302 X |

DONALL H. SYLVESTER, *Primary Examiner.*

F. W. MIGA, *Assistant Examiner.*